United States Patent [19]
Lepley

[11] 3,907,131

[45] *Sept. 23, 1975

[54] BOTTOM UNLOADING MEANS FOR SILO

[75] Inventor: James W. Lepley, Smithville, Ohio

[73] Assignee: Flying Dutchman, Inc., Smithville, Ohio

[ * ] Notice: The portion of the term of this patent subsequent to Aug. 13, 1991, has been disclaimed.

[22] Filed: June 6, 1974

[21] Appl. No.: 477,072

Related U.S. Application Data

[63] Continuation of Ser. No. 386,196, Aug. 6, 1973, Pat. No. 3,828,946.

[52] U.S. Cl.............. 214/17 DA; 222/227; 222/228
[51] Int. Cl.².......................................... B65G 65/46
[58] Field of Search...... 214/17 D, 17 DA; 222/227, 222/228

[56] References Cited
UNITED STATES PATENTS

| | | | |
|---|---|---|---|
| 3,567,078 | 3/1971 | Herr et al................... | 214/17 DA X |
| 3,710,960 | 1/1973 | Stauffer et al. ................ | 214/17 DA |
| 3,828,946 | 8/1974 | Lepley........................... | 214/17 DA |

Primary Examiner—Robert G. Sheridan
Attorney, Agent, or Firm—Mason, Kolehmainen, Rathburn & Wyss

[57] ABSTRACT

A silo arranged for unloading from the bottom by means of a central shaft and auger extending upwardly from the bottom of the silo and a plurality of flexible dislodging members connected at their inner ends to said shaft at vertically spaced locations between the upper and lower ends thereof, said dislodging members varying from one shortest in length at the lower end of said shaft and increasing in length progressively upward toward an intermediate level and thereafter decreasing in length toward an upper level to form an arch in the silage contained in said silo above said unloader, the outer end of a longest member being spaced inwardly of the interior of the silo wall when fully extended to form an annular wall of silage around the outermost boundry of the arch which is not unduly compressed and which flakes away to permit gradual descent of the mass of silage above the unloader as silage is discharged from the silo.

12 Claims, 8 Drawing Figures

BOTTOM UNLOADING MEANS FOR SILO

BACKGROUND OF THE INVENTION

This application is a continuation of the copending U.S. patent application, Ser. No. 386,196 filed Aug. 6, 1973 now U.S. Pat. No. 3,828,946, issued Aug. 13, 1974.

In recent years, the diameter and height of silos has gradually increased until at present, heights of 75 and 100 feet are not uncommon, and diameters of between 20 and 30 feet are quite common. Unloading the contents of silos of this range of sizes has presented many problems in the past, some of which have been solved by the introduction of bottom unloading means. Several examples of such bottom unloading means comprise the subject matter of U.S. Pat. Nos. 3,424,350, Jan. 28, 1969; 3,567,078, Mar. 2, 1971; and 3,710,960, Jan. 16, 1973.

The use of flexible chains attached to a central shaft and auger such as illustrated in the aforementioned patents has presented marked improvements over prior bottom unloading devices but it has been discovered by the present inventor that, particularly in regard to employing such augers and chains in large diameters and heights of silos, difficulties have arisen in view of the height of the auger and length of the dislodging chains employed in the devices shown in said patents, and especially those in use.

It will be seen from said patents that the length of the chains attached to the auger shaft, commencing with the lowermost, which are the shortest, gradually increase in length until the uppermost chain is the longest. This arrangement of chains results in providing a residual deposit of silage in the bottom of the silo forming a funnel-shaped cavity. The cavity surface slopes toward the central portion of the silo and is not disturbed until the silo is completely unloaded. In practice, the uppermost chain on the shaft was of a length slightly greater than the radius of the inner cylindrical surface of the silo and the height of the shaft was normally no greater than the radius of said interior surface of the silo. Operation of this type of unloading mechanism resulted in the formation of a relatively flat arched dome or ceiling in the cavity formed in the mass of silage within the silo and at the periphery of said flatly arched surface, only a relatively thin annular wall of silage was formed between the path of the outer end of the longest, uppermost chain and the silo wall as the chain was revolved by the shaft. The height of this thin annular wall of silage was very short or practically nonexistent and the silage in this area became exceedingly compacted due to the great weight of the tremendous mass of silage contained in the silo above said cavity formed by the dislodging chains. The silage was so solid and tightly compacted that in many situations it was practically impossible to break down by the digging elements on the ends of the rotating chains. Continued rotation of the chains thus resulted in no further dislodgment of the compacted silage and it then became necessary for a person to enter the cavity in the silage within the silo to manually dig away at the compacted mass around the wall. This was extremely dangerous because of the chance of being crushed and/or suffocated by falling silage after the compacted material was dislodged by the digging.

It has now been discovered that the foregoing difficulties can be obviated by making certain important changes in the dimensions of the auger and the flexible dislodging members, such as chains, connected thereto, details of which are set forth below.

SUMMARY OF THE INVENTION

It is the principal object of the present invention to provide bottom unloading means for silos and especially silos of substantial diameter and height, the unloading means comprising a shaft disposed centrally in the silo and extending upwardly from the bottom thereof a distance in excess of the radius of the interior of the silo. It has been found that very beneficial results have been achieved in view of such increased height in the shaft, for reasons set forth hereinafter.

It is another object of the invention to provide flexible dislodging members, such as chains, which are connected at one end to the shaft at vertically spaced distances, a lowermost chain being relatively short and successively higher chains increasing in length but toward an intermediate level and thereafter decreasing in length to aid in the formation of a relatively steep arch at the top of the cavity formed in the silage by the rotating chains.

A still further object of the invention is to position a longest flexible dislodging member below the uppermost dislodging member, the latter being shorter than the longest member.

Still another object of the invention is to provide a pair of chains of the longest dimension spaced vertically apart by a distance or vertical spacing similar to that between the other chains connected to the shaft, both of said longest chains however being spaced below an uppermost chain which is shorter in length. The outer ends of the pair of longest chains travel in a path spaced inwardly of the silo wall surface and produce a substantially cylindrical, thin wall of silage around the periphery of the greatest dimension of the cavity. This thin wall of silage is formed between the lower funnel-shaped portion of the cavity in the silage and the upper, more steeply arched ceiling of the cavity and is of a thickness suitable under normal circumstances to prevent the overhead mass of silage from unduly compacting the silage making up the thin annular wall. The thin wall of silage is gradually eaten away by the chains and permits a gradual and controlled descent of the large mass of silage above the unloader as the silage is discharged.

A further object of the invention is to provide an unloader with an uppermost flexible dislodging member shorter than one or more of the flexible members therebelow for the purpose of digging an arched ceiling for the cavity in the silage forming the supporting bottom surface of an overhead mass of silage gradually moving downward in the silo during the unloading process. The arched ceiling is formed somewhat steeper and with a higher curvature than with previous unloaders, thereby resulting in lower pressures caused by the overhead mass of silage upon the thin annular wall of silage at the outermost confines of the cavity within the silo. Excessive pressure in this area produced by unloaders forming flatly arched ceiling surfaces is believed to have caused ruptures in silo walls and this problem has been eliminated and reduced by the unloader of the present invention.

Details of the foregoing objects and of the invention as well as other objects thereof, are set forth in the following specification and illustrated in the accompanying drawings comprising a part thereof.

DETAILED DESCRIPTION

The present invention comprises a substantial improvement over the bottom unloading devices illustrated and claimed in the aforementioned prior U.S. patents wherein the unloaders include an auger and/or shaft of a length less than the radius of the interior of the silo. Another feature of the present invention resides in the use of flexible discharge members or chains of a length shorter than the radius of the interior of the silo with the digging elements on outer ends of the longest chains spaced inwardly of the interior surface of the silo walls when said flexible members are fully extended. Under such circumstances, the full length of the flexible members is employed for dislodging purposes, whereas, in contrast, in the prior art devices, at least as manufactured and sold, said longest chains were sometimes of greater length than the radius of the interior of the silo, with the result that the inner ends of the chains normally would be partially wrapped around the auger or the shaft to which they were connected and accordingly the excess chain length was useless.

Another feature of the present invention rests in the fact that one or two flexible members of the greatest length are mounted in vertically spaced relationship at an intermediate level on the shaft and these longest members are spaced below an uppermost member which is shorter in length. The uppermost chain forms a more steeply arched top surface or ceiling in the cavity formed within the silage mass than the relatively flat ceilings formed by the unloading mechanisms of the prior art.

Figure 1:
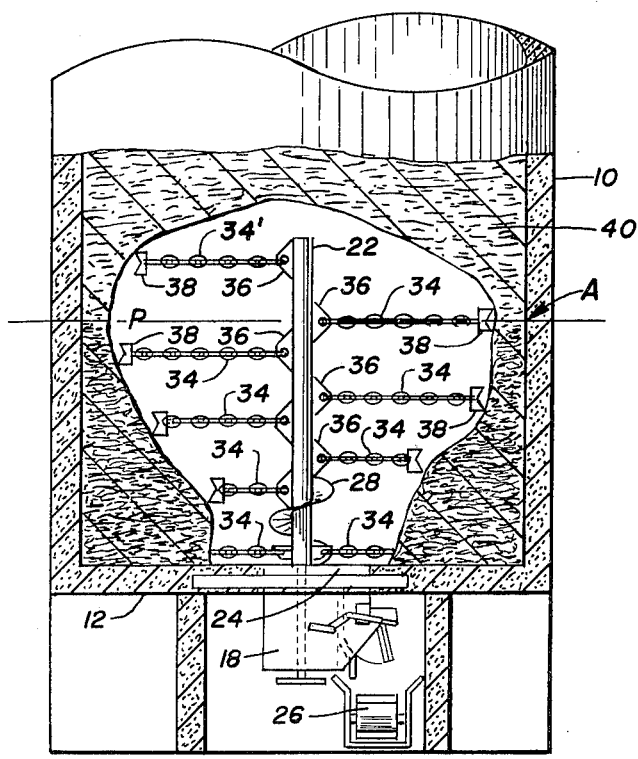
FIG. 1 is a foreshortened vertical elevation, largely in section, showing a typical silo embodying the principals of the present invention.
Figure 2:
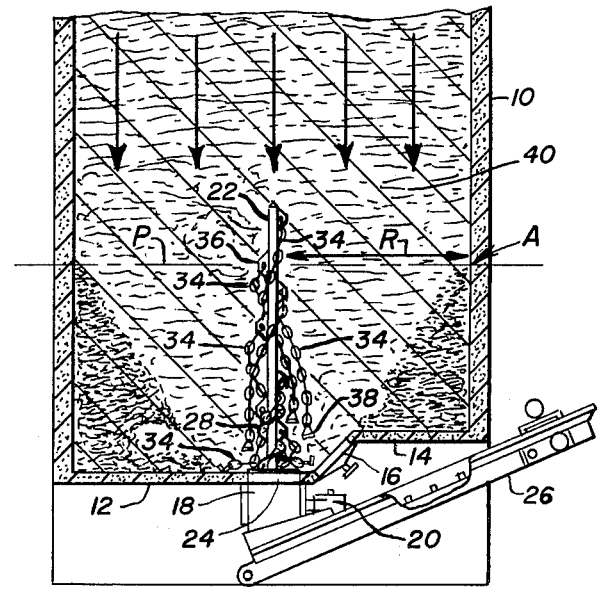
FIG. 2 is a fragmentary, vertical elevation showing the sectioned portion of the silo shown in FIG. 1 and illustrating the unloading mechanism at the time operation of the mechanism is to commence, said view illustrating the embodiment of the invention.

The exemplary structure shown in the drawings in which the foregoing features are embodied comprises a new and improved bottom unloader for silos and the like. Referring to FIGS. 1 and 2, therein is illustrated the lower portion of a conventional silo within which an unloading mechanism in accordance with the present invention has been mounted. The silo includes a wall 10 substantially cylindrical shaped and formed of any suitable material in accordance with conventional practice. The silo also includes a bottom 12 which may be either completely horizontal, as shown in FIG. 1, or may have a fragmentary portion 14 at a higher elevation than the remaining portion of the bottom for the purpose of providing an access manhole 16 shown in FIG. 2. A power unit 18 comprises a housing which is connected to the bottom 12 of the silo by any suitable means and a motor 20 (see FIG. 2) interconnected to speed-reducing means of conventional nature is provided for driving the shaft 22. The lower end of the shaft extends through suitable bearings, not shown, mounted within the housing of the power unit 18.

A discharge opening 24 is formed in the bottom 12 of the silo adjacent one side of the lower end of shaft 22 as shown in FIG. 1. In FIG. 2, the opening 24 is viewed at 90° to that shown in FIG. 1 and therefore appears to be in vertical alignment with shaft 22. An appropriate discharge conveyor 26 receives silage discharged through the openings 24 and carries the same to suitable means such as a cart, wagon or otherwise for transportation to a feeding site.

Figure 5:
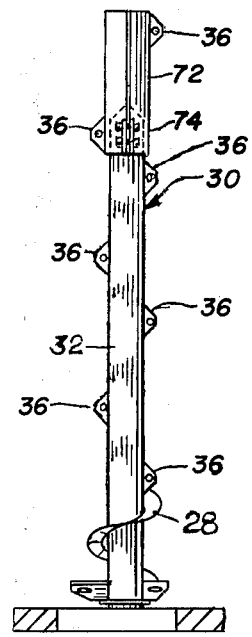
FIG. 5 is a partially fragmentary vertical elevation showing further details of the auger and the shaft associated therewith for purposes of supporting a series of flexible dislodging members which are vertically spaced relative to the shaft and one end of said members is connected to the attaching means illustrated on the shaft in said figure.
Figure 2A:
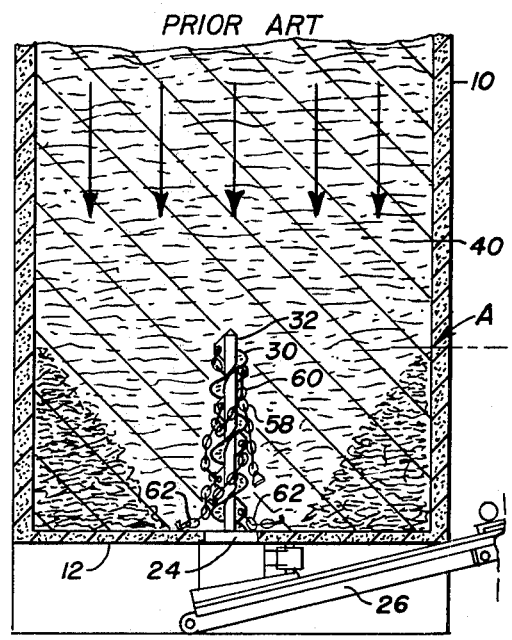
FIG. 2A is a view similar to FIG. 1 but representing a corresponding view of the unloading mechanism of the prior art for purposes of contrasting the same relative to the embodiment shown in FIG. 2.
Figure 3:
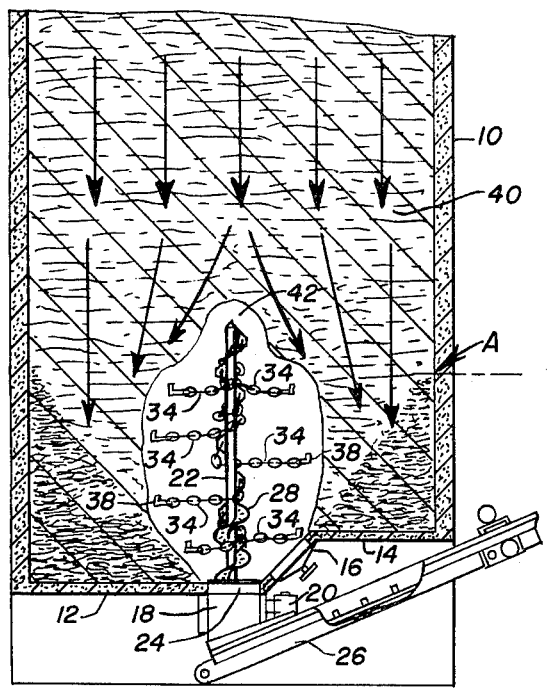
FIG. 3 is a view similar to FIG. 2 but showing an initial practical formation of a cavity within the mass of silage within the silo.

In accordance with the present invention and as distinguished from some of the prior art structures, a relatively short auger 28 is fixed to a lower end portion of shaft 22 and preferably comprises only several convolutions of a flight. In certain of the prior art structures, as illustrated in FIG. 2A, an auger 30 extends substantially to the top of the shaft 32. By comparing FIGS. 2 and 2A, it will be seen that the shaft 22 of FIG. 2, extends upwardly from the bottom 12 a distance substantially greater than the radius R of the interior of the silo shown in FIG. 2. In FIGS. 1 and 2, the level P represents a plane at a height equal to the interior silo radius above the bottom wall 12 and as it is readily seen from FIGS. 1 and 2 an appreciable additional portion of the shaft 22 extends above the level P. As best shown in FIG. 1, a plurality of flexible, silage material, dislodging members 34, specifically comprise a plurality of separate heavy duty chains, are connected at their inner ends to the shaft 22 at vertically spaced locations thereon. The shaft is provided with spaced connectors thereon such as the apertured ears 36 for connection to the chains as best shown in FIG. 5. It will also be seen that the chains 34 vary in length and increase progressively from a lowermost chain toward an intermediate level adjacent the radius level P. One or more chains 34 of maximum length are provided adjacent the intermediate level and as shown in FIG. 3 these chains when rotated form a thin annular wall of silage around the silo for supporting the weight of the large mass of silage above the cavity formed in the silage by rotating chains of the unloader. As shown in FIG. 3, the chains of maximum length adjacent the intermediate or radius height level are labeled 34L and 34L' and downwardly of this level the shorter chains dig out a funnel-shaped or generally conical lower portion of the cavity that is formed in the mass of silage by the rotating chains. The lower funnel-shaped portion of the cavity serves to direct the silage that is removed from the upper mass of silage by the chains toward the central discharge opening 24 in the silo bottom.

Figure 4:
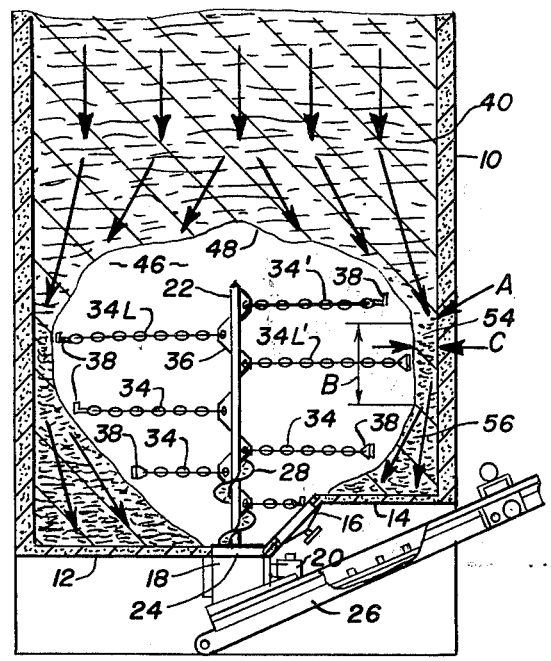
FIG. 4 is a view similar to FIG. 3 but showing the formation of a substantially complete configuration of cavity within the mass of silage and the silo, as produced in accordance with the unloading mechanism embodying the principals of the present invention.
Figure 4A:
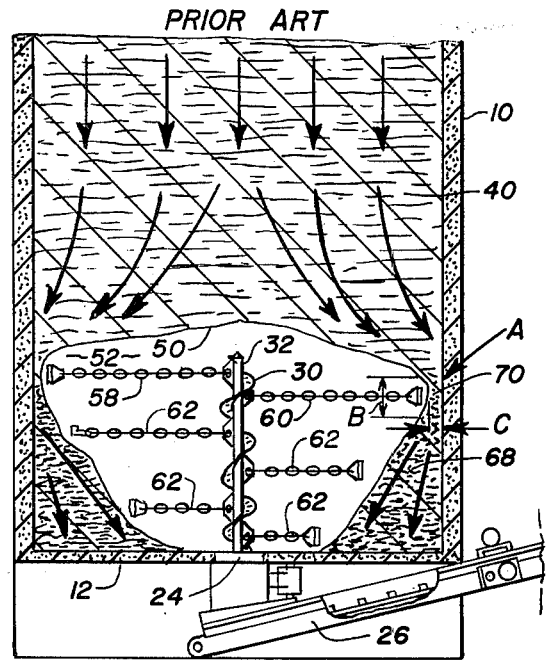
FIG. 4A is a view similar to FIG. 4 but showing a corresponding prior art unloading device and a cross sectional view of the maximum size of cavity produced by such device for purposes of contrasting the same with respect to the cavity formed by the present invention.

In accordance with the features of the present invention, there is provided one or more chains 34' (FIG. 4) spaced above the intermediate level chains 34L and 34L'. The chain 34' is of a shorter length than the intermediate level chains and serves to dig out and form a steeply sloped arching top surface for the cavity formed in the silage. In comparing the cavity produced in the silage by the unloader of the present invention as shown in FIG. 4 with that produced by the prior art device shown in FIG. 4A, it will be seen that the arched top surface in the latter cavity is relatively flat and further, that the periphery of the flatly arched top surface and the funnel-shaped bottom surface intersect rather sharply producing a relatively thin short annulus of highly compacted silage in the area labeled 70. Because, this relatively thin, relatively short, band of silage must support the entire weight of the mass of silage above, the pressure of compaction in the silage is extremely high and in some case this pressures has been high enough to rupture the wall of the silo. The unloader of the present invention eliminates this difficulty by forming a cylindrical band or wall of silage adjacent the intermediate level of the chains 34L and 34L', which band is greater in thickness and in height (FIG. 4) than that formed by the prior art unloaders as illustrated in FIG. 4A. The thicker, higher, cylindrical band of silage produced by the loader of the present invention results in much lower compaction of the silage and much lower stress concentration so that the possibility of silo wall failure is reduced or eliminated entirely. In addition, the reduced compaction of the silage precludes the necessity for manual digging out of a highly compacted band of silage and the dangerous consequences resulting therefrom.

It is seen from FIG. 4 that the more steeply sloped arched surface at the top of the silage cavity provides for a smoother transition of the stress vectors into the annular band of silage around the intermediate chains 34L and 34L' and this reduces the stress or compaction pressure on the silage in this area to a level far below that produced with the prior art devices (FIG. 4A) which employ a chain of maximum length at the uppermost level. The shorter length chain 34' above the chains 34L and 34L' forms the more steeply arched top surface of the silage cavity and the use of a pair of vertically spaced chains 34L and 34L' of maximum length rather than a single chain provides for a greater height (as represented by the arrow B) for the silage band at the intermediate level. This factor further reduces stress concentration and more evenly distributes the stress in the silage because of the reduced angular transition of the force vectors. In addition the thickness of this band of silage 54 (FIG. 4) as measured by the arrow C is greater than for the silage band 70 (FIG. 4A) produced by the prior art devices and this factor further reduces the silage compaction so that as the mass of silage above the unloader moves slowly downward during an unloading operation and the chain 34' is effective to maintain a more steeply arched top cavity surface. The spaced pair of maximum length chains 34L and 34L' adjacent the intermediate or radius level P are continuously effective to break down the inside edge of the silage moving adjacent the cylindrical annular band 54. The shortest chain is connected adjacent the bottom discharge opening 24.

Figure 3A:
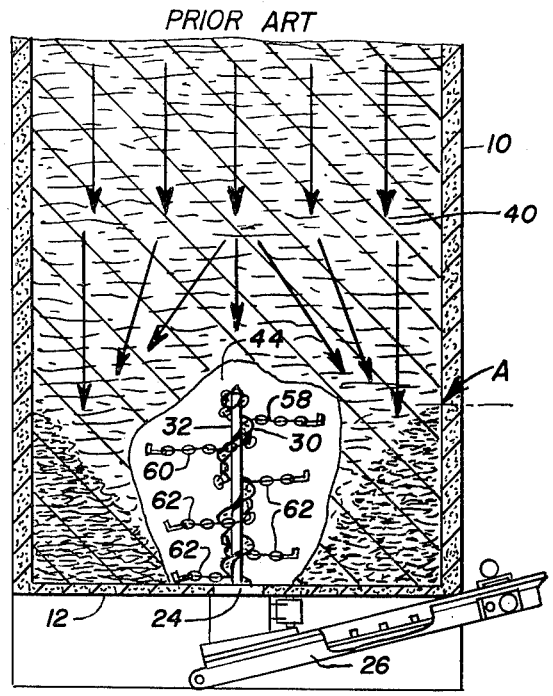
FIG. 3A is a view similar to FIG. 3 but showing a prior art unloading device at a similar stage of initiation of an unloading operation for purposes of contrasting the same with respect to the embodiment shown in FIG. 3.

Each of the chains 34 have digging elements 38 connected to the links at their outer ends for engaging and digging away the compacted silage 40 within the silo. Either at the time the silo is initially filled with the silage or at the conclusion of an individual unloading operation, the dislodging chains 34 normally hang downwardly as shown in FIG. 2 and also in FIG. 2A. When a discharge operation is undertaken, the motor 20 is energized and the shaft 22 commences to rotate. During the initial portion of the operation, the auger 28, (which rotates in a direction whereby the flights move silage downwardly through the discharge opening 24) forcefully discharges the silage through the opening. Engagement of the downwardly hanging chains 34 with the silage also causes a certain amount of dislodgement of silage from the mass and, as the silage is progressively loosened, centrifugal force begins to cause the chains with the digging elements 38 on the outer ends to lift upwardly toward the horizontal. As this occurs a vertically extending cavity 42 as shown in exemplary manner in FIG. 3 begins to form in the silage mass. Because of the greater height of the shaft 22 in the structure of the present invention, in contrast to that of the shorter shaft 32 of the prior art, as shown in FIG. 3A, the cavity 42 is of greater height and more elongated than the cavity 44 formed by the prior art device as shown in FIG. 3A.

As expansion of the cavity 42 continues, centrifugal force gradually causes the flexible chains 34 to extend horizontally outward of the shaft substantially to their full lengths, as shown in FIGS. 1 and 4. In these views, the difference in length of the respective flexible chains 34 is readily apparent and these differences in length are significant as previously described in the formation of a cavity 46 in the silage at the location as shown and of the size and shape described with the advantages resulting therefrom. The cavity 46 has a much higher and more extensively and steeply arched top surface or ceiling 48 than the relatively flat ceiling surface of the cavity 52 formed by the prior art unloader as illustrated in FIG. 4A. These differences in the sizes and shapes of the respective cavities 46 and 52 are believed to be due to the following phenomenon.

In the structure of the present invention, not only is the shaft 22 of greater height than the shaft 32 of the prior art unloader, but in addition, as clearly shown in FIGS. 1 and 4, the uppermost flexible chain 34' is shorter than the longest flexible chains 34L and 34L' which are spaced downwardly on the shaft 22 below the chain 34'. In actual practice, particularly where the silo is of the order of about 20 feet in diameter, it is preferred that the uppermost chain 34' be approximately the same amount shorter than the longest chains 34L and 34L' as the vertical spacing between these chains. In addition, there is provided a pair of maximum length chains 34L and 34L' instead of a single, uppermost, maximum length chain 58 in the prior art unloader. As set forth, the pair of maximum length chains 34L and 34L' form a relatively thick annular wall 54 of silage of substantial height represented by the arrow B as shown in FIG. 4. This wall or band of silage is of substantially uniform thickness C and in actual practice, the dimension C is approximately 1 foot, whereas the dimension B may be between 1 and 2 feet. At its mid level, the annular wall or band of silage 54 is spaced approximately the same distance as the interior radius of silo upwardly above the bottom wall 12 of the silo.

Because of the greater thickness C of the annular silage wall 54 between the funnel-shaped lower cavity surface defined by a compacted silage mass 56, reposing upon the bottom 12 of the silo, and the somewhat more steeply arched configuration of the ceiling 48 of cavity 46, the silage of the annular wall 54 does not become excessively compacted by the weight of the mass of silage 40 above the cavity 46. The consistency of the silage in the annular band 54 remains such that it progressively flakes off as the digging members 38 on the chains 34L and 34L' engage the inside surface thereof as they flail around during the unloading operation. This results in the wall or band 54 gradually giving way and being reformed from above by the gradual descent of the upper mass of silage 40 above the cavity. When the wall or band of silage 54 reaches a sufficient height (approximately 1 foot), the band commences to collapse and this allows the silage forming the ceiling 48 of the cavity to move downwardly and be engaged, by the uppermost chain 34' and the chain 34L which flail and dig against the silage to provide dislodgment of silage material from the main mass in the silo above the unloader. As the silage is dislodged from the large mass or body it falls downwardly onto the bottom funnel-shaped surface of the cavity toward the discharge opening 24, meanwhile being further disingrated by the lower, shorter flexible members 34.

In contrast to the foregoing discussion of the unloader of the present invention, a prior art unloader as viewed in FIG. 4A, which represents a typical prior art structure presently in use, the uppermost flexible member or chain 58 is the longest and the next lower chain member 60 is somewhat shorter, with additional lower flexible chains 62 being progressively shorter, with the shortest being near the discharge opening 24. Because of the fact that the longest chain 58 is uppermost and is connected to the upper end of the shaft 32 which is normally no greater in height than the radius of the interior diameter of the silo (usually a little less than radius dimension), it will be seen that the ceiling of a cavity 50 formed by the prior art unloader is relatively flat. Also, at the periphery, the ceiling surface directly intersects and engages the upper edge of a funnel-shaped lower cavity surface formed by the mass of silage 68 left undisturbed by the shorter chains. An extremely thin, narrow intermediate section 70 which extends vertically for only a matter of a few inches (indicated by the letter B in FIG. 4A) is formed and the thickness of this section (indicated by the letter C) is of the order of only a few inches. Accordingly the weight exerted by the large overhead mass of silage above the unloader is concentrated in a small area and results in tremendous pressure being exerted upon the intermediate section 70 of silage, with the result that the silage becomes compacted to such an extent that oftentimes the digging elements on the ends of the flexible chains 58, 60 and 62, and especially those on the longest chain 58 are ineffective to dislodge the silage material. When this occurs further unloading operations are terminated and emergency measures are required to loosen the highly compacted band of silage. Often this requires a worker to enter the cavity through a manhole (for example, normally provided in the bottom 12 of the silo similar to manhole 16 shown in FIGS. 2–4) and the worker must then chip away at the band of highly compacted material 70, with the consequent risk of being inundated by the falling material. The higher and thicker wall of silage 54 formed by the unloader of the present invention, as shown in FIG. 4 and the much more steeply arched ceiling 48 of the cavity 46 results in the mass 40 of overhead silage producing far less compactness in the wall of silage 54, which wall gradually flakes away to cause a gradual lowering of the ceiling 48 for continuing engagement by the uppermost flexible chain 34' and the chain 34L.

In order that the advantages of the present invention might be incorporated into existing silos and bottom-unloading mechanisms included therein, attention is directed to FIG. 5 in which it will be seen that the shaft 32 in accordance with a prior art mechanism such as illustrated in FIGS. 2A–4A, is provided with an extension 72 connected to the upper end thereof by means of a clamping sleeve 74. The extension shaft 72 or sleeve 74 has one or more apertured ears 36 secured thereto and flexible chains or members 58, 60 and 62 of the prior art are replaced with chains having dimensions corresponding to the flexible chains 34', 34L, 34L' and 34 in accordance with the unloading mechanism of the present invention.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A silo unloader for a bottom unloading type silo having a discharge opening in a bottom wall thereof, said unloader including a shaft adjacent the center of said silo and extending upwardly of said bottom wall, auger means on said shaft adjacent to lower portion thereof for moving silage through said discharge opening in said bottom wall, motor means for rotating said shaft, a plurality of separate flexible dislodging members each supported at an inner end from said shaft at vertically spaced locations thereof, said flexible members having progressively increased lengths spaced upwardly of a shortest, lowermost member toward one or more maximum length flexible members supported from said shaft adjacent an intermediate level upwardly of said bottom wall, said maximum length flexible members having a length dimensioned so that outer ends thereof move around a path spaced inwardly of the interior surface of said silo upon rotation of said shaft with said flexible members fully extended outwardly of said shaft thereby forming a thin annular wall of silage around the periphery of said path, and one or more upper flexible members of a length shorter than said maximum length flexible members and spaced upwardly thereof on said shaft for forming an arched ceiling surface of a cavity developed within the silage in said silo by rotation of said flexible members upon rotation of said shaft, said cavity having a funnel-shaped lower surface in communication with said discharge opening formed by lower ones of said flexible members, said lower surface joining an inside surface of said thin annular wall of silage formed by rotation of said maximum length flexible members, said inside surface joining said arched ceiling surface formed by said upper flexible members, said thin annular wall of silage having a thickness preventing excessive compression of said silage therein and progressively collapsing to permit a gradual descent of a mass of silage in said silo above said shaft.

2. The silo unloader according to claim 1 wherein the upper end of said shaft is spaced above the bottom of said silo by a distance greater than the radius of the interior of said silo and said maximum length flexible members are supported from said shaft at a level below the upper end thereof.

3. The silo unloader according to claim 1 wherein one of said flexible members of maximum length is supported from said shaft at a level spaced above the bottom of said silo by a distance substantially equal to the interior radius of said silo.

4. The silo unloader according to claim 1 including a pair of said maximum length flexible members supported from said shaft at spaced apart levels thereon, said upper flexible member spaced above an upper one of said maximum length flexible members and having a length shorter than said maximum length flexible member by an amount substantially equal to the spacing between said spaced apart levels.

5. The silo unloader according to claim 4 wherein said pair of maximum length flexible members are spaced vertically apart on said shaft a limited distance whereby upon rotation of said shaft a cylindrical wall of silage of substantially uniform thickness and a height substantially equal to said limited distance is formed around the outermost periphery of said cavity within said silage.

6. The silo unloader according to claim 1 including silage dislodging digging elements connected to outer ends of said flexible members and spaced inwardly of the interior surface of said silo with said flexible members fully extended when said shaft is rotated.

7. A silo unloader for a bottom unloading type silo having a discharge opening in a bottom wall thereof, said unloader including a rotatable shaft adjacent the center of said silo and extending upwardly of said bottom wall; and a plurality of separate flexible silage dislodging members, each supported at an inner end from said shaft at vertically spaced levels, an upper one of said flexible members having a length shorter than a lower flexible member of maximum length for forming an arched ceiling surface of a cavity developed in the mass of silage contained in said silo upon rotation of said shaft to swing said flexible members outwardly thereof for a dislodging silage from the mass.

8. The silo unloader of claim 7 wherein said maximum length flexible member includes an outer end movable around a path spaced inwardly of the interior wall surface of said silo when said flexible member is fully extended outwardly of said shaft on rotation thereof, said upper flexible member including an outer end movable around a path spaced inwardly and upwardly of the path of said maximum length flexible member.

9. The silo unloader of claim 7 including a second flexible member of maximum length vertically spaced from said lower flexible member, said maximum length flexible members having outer ends moving around a path spaced inwardly of the interior wall surface of said silo forming a thin annular wall of silage around the periphery of said cavity for supporting said silage mass above said unloader.

10. The silo unloader of claim 9 wherein at least one of said maximum length flexible members is supported from said shaft adjacent a level spaced upwardly of the bottom wall of said silo by a distance substantially equal to the internal radius of said silo.

11. The silo unloader of claim 7 including a plurality of lower flexible members spaced below said maximum length flexible member, said lower flexible members having progressively shorter lengths spaced downwardly of said maximum length flexible member thereby by forming a frustroconically shaped lower surface of said cavity in said silage upon rotation of said shaft, said lower cavity surface in communication with said discharge opening in said bottom wall.

12. The silo unloader of claim 11 wherein said flexible members comprise chains secured at their inner ends adjacent said shaft and a silage engaging digging elements for dislodging the silage upon rotation of said chains connected adjacent the outer end of each chain.

* * * * *